United States Patent [19]

Hertell

[11] 4,255,098
[45] Mar. 10, 1981

[54] ROTARY VANE PUMP ASSEMBLY

[75] Inventor: Siegfried Hertell, Radevormwald, Fed. Rep. of Germany

[73] Assignee: Barmag Barmer Machinenfabrik Aktiengesellschaft, Remscheid-Lennep, Fed. Rep. of Germany

[21] Appl. No.: 888,877

[22] Filed: Mar. 22, 1978

[30] Foreign Application Priority Data

Mar. 22, 1977 [DE] Fed. Rep. of Germany ... 7708877[U]
May 23, 1977 [DE] Fed. Rep. of Germany ... 7716231[U]

[51] Int. Cl.³ .................... F04B 35/00; F04C 29/02
[52] U.S. Cl. ........................... 418/76; 418/81; 418/82; 418/94; 417/372
[58] Field of Search .............. 418/76, 81, 82, 93, 418/94, 97–100, 182; 417/372

[56] References Cited

U.S. PATENT DOCUMENTS

| | | | |
|---|---|---|---|
| 1,520,248 | 12/1924 | Jacobsen et al. | 418/93 |
| 2,148,070 | 2/1939 | Gregg | 418/98 |
| 2,633,292 | 3/1953 | Voznica | 418/93 |
| 2,902,012 | 9/1959 | Malcolm | 418/97 |
| 3,865,515 | 2/1975 | Allen | 418/97 |
| 4,086,040 | 4/1978 | Shibuya et al. | 418/100 |
| 4,091,638 | 5/1978 | Mitch | 418/100 |

*Primary Examiner*—John J. Vrablik
*Attorney, Agent, or Firm*—John H. Shurtleff

[57] ABSTRACT

An improved rotary vane machine assembly of the type utilized for producing vacuum in motor vehicle power brake assistance units wherein a compensating coupling connects the pump drive shaft with the drive motor of the pump and a lubricant is supplied to the working elements of the pump from said drive motor, the improvement comprising a pot-shaped hood which receives the working components of the pump and, in particular, the rotor and vanes, and a mounting flange having a bell-shaped foot portion surrounding the compensating coupling and a lid portion covering the open end of the pot-shaped hood. A compensating disc which limits the operating chamber of the working components in an axial direction is also disclosed, the compensating disc being pressed against the face of the vanes by means of a cushion of lubricant and/or a compression spring.

16 Claims, 8 Drawing Figures

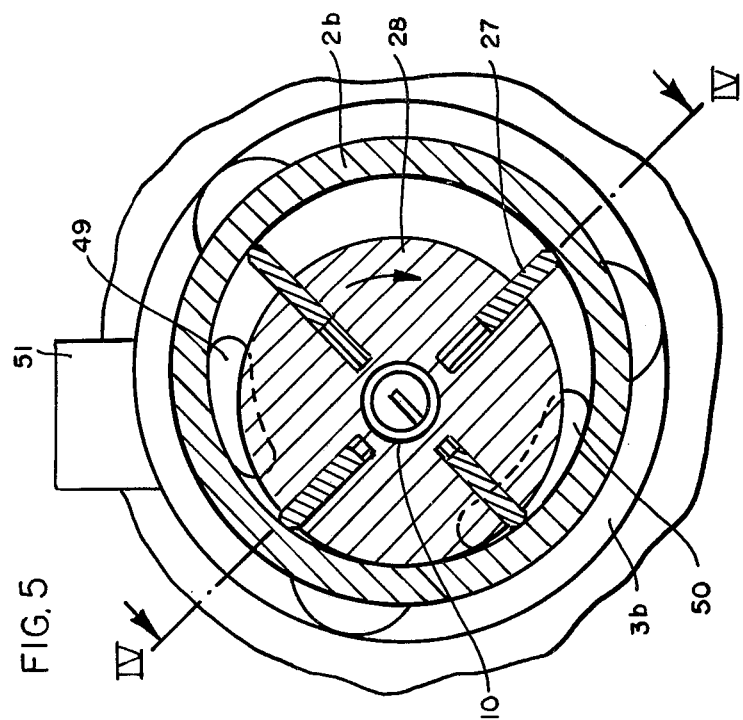
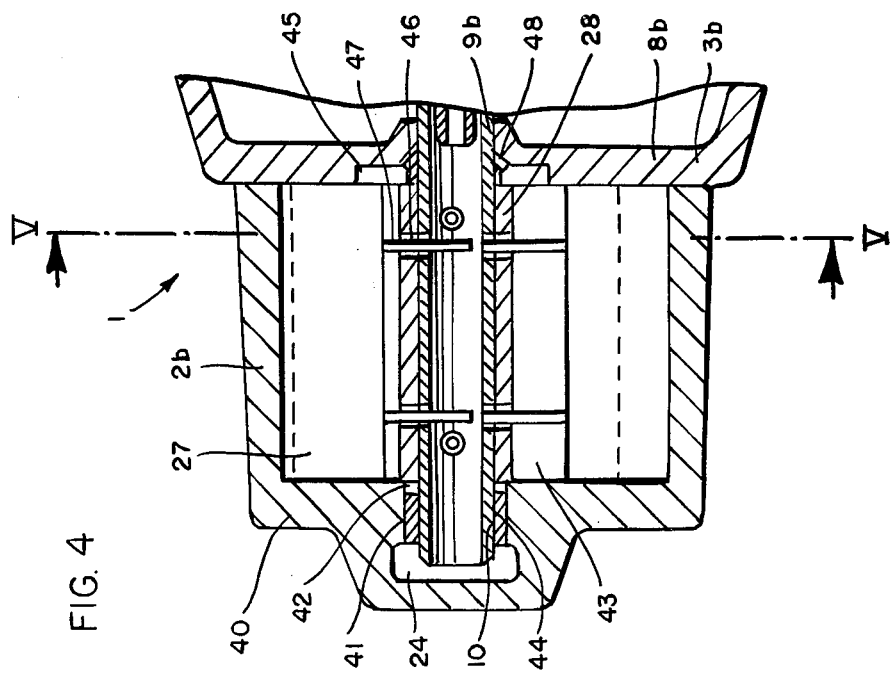

ROTARY VANE PUMP ASSEMBLY

INTRODUCTION

The present invention relates generally to a rotary vane pump assembly and, more particularly, to such a pump for producing a vacuum in motor vehicle power brake assistance units wherein a compensating coupling connects the pump drive shaft with the drive motor of the pump.

BACKGROUND OF THE INVENTION

The housing of rotary vane pumps or machines usually consists of an annular casing having two covers for the circular end openings of the casing. The cover facing away from the drive motor of the pump generally has a flange projecting over the circumference of the annular casing or, in the alternative, several projecting catches which are used for fixing the pump to its drive motor housing with the aid of long screws. However, with such conventional arrangements, there is a risk of the housing being somewhat squeezed or compressed when such fixing screws are tightened. The resulting reduction in the axial clearance between the rotor and housing may cause the rotor and vanes to bind or jam in the pump or the machine housing and bearings may be improperly tilted on the drive motor housing if the screws are tightened unevenly, which may lead to not only leakage between the annular casing and its covers but also to cracks or splits in the housing itself.

Furthermore, with such prior art designs it was necessary to provide special connecting pipes leading from the pump housing for the suction and delivery connections for the outgoing air and lubricant.

BRIEF DESCRIPTION OF THE INVENTION

It is an object of the present invention to design the housing of a rotary vane machine so as to ensure the easy assembly and integration of the machine on its drive motor housing, and in particular, when such a pump is utilized in a motor vehicle, with the most desirable output-to-weight ratio. This object is achieved by providing a pump having a pot-shaped hood which receives the working components of the pump and, in particular, the rotor and vanes, and a mounting flange having a bell-shaped foot portion surrounding the compensating coupling and a lid portion covering the open end of the pot-shaped hood.

A rotary vane machine formed in accordance with this embodiment of the invention may be integrated without difficulty to the drive motor housing, even in motor vehicles, with all of the connection pipes required for the suction, delivery and lubricant connections. Furthermore, with this embodiment of the invention it is no longer possible to crack or distort the housing when assembling the pump to the drive motor housing. It should be noted that during assembly the foot of the housing is sealed about the drive motor housing.

A rotary vane "pump" or "machine" in the context of the present invention applies not only to a vane pump in the strict definitional sense of the word but also to a rotary vane motor. Of course, a drive motor is not required with a vane motor but, nevertheless, a fastening must also be possible for such a unit for flanging the output shaft of the vane motor on to a gear unit.

In another embodiment of the present invention, the foot portion of the mounting flange is formed as an oil collector for the lubricant flowing from the working components of the vane machine back into the drive motor housing. Accordingly, this embodiment allows the pressure medium and oil carried along with it to be discharged in a sealed manner from the unit and also allows the oil issuing at the bearing on the drive motor side of the machine to be carried away. The oil centrifuged by the machine shaft, the compensating coupling and the motor drive shaft is advantageously collected by the foot of the housing and fed into the oil sump which may either be located in this housing foot or in the housing on which the vane machine is flanged. Special pipes for the issuing lubricating oil are therefore not needed. This embodiment thereby simplifies and substantially reduces the manufacturing cost of the housing in relation to conventional vane machines in which the oil delivery pipes pass radially out of the operating chamber of the pump and then are continued as axially parallel passages in the housing wall.

A tight and reliable joint between the housing and drive housing or gear unit may be guaranteed by forming an outwardly directed flange on the foot portion of the mounting flange for fixing said flange on to the drive housing or gear unit and forming a second flange portion on the lid portion of the mounting flange for joining the pot-shaped hood of the machine to said lid portion. By forming the second flange portion in a radially inwardly pointing direction and locating a fixing means at the open end of the pot-shaped hood for connecting said hood to the radially inward pointing portion of the second flange, the operating chamber of the machine may be sealed airtight, thereby satisfying the required conditions for making the machine highly efficient. Furthermore, by forming said fixing means as screw-threaded passages which extend to the open end of the pot-shaped hood as pockets, any oil which may possibly be present in the foot of the housing will be prevented from flowing out through the screw connections between the hood and foot of the housing.

In a further development of the machine housing according to an embodiment of the present invention, the bell-shaped foot portion of the mounting flange may be made of a light-weight metal and the lid portion thereof may have a sliding bearing formed therein in which the pump drive shaft rotates. A recess may be formed in the lid portion of the mounting flange and/or the open end portion of the pot-shaped hood for connecting the drive shaft bearings with the chambers created between the base of the rotary vanes and the slits formed in the rotor in which the vanes radially slide. In this manner, a reliable mounting for the drive shaft is provided with a minimum outlay in material and expense.

In contrast to known vane machines in which the air suction inlet is located in the peripheral surface of the operating chamber, in accordance with another embodiment of the present invention air is sucked into the operating chamber through a pipe connection formed vertically (in a cross-sectional plane) in the bell-shaped foot portion of the mounting flange, said vertical connection turning in an axially parallel direction to the pump drive shaft and opening in the lid portion of the mounting flange between the pot-shaped hood and mounting flange of the pump. This opening may be formed in the lid portion as a reinform-shaped recess. In this manner, one of the disadvantages of known vane machines wherein substantial amounts of lubricant enter the mouth of the suction pipe owing to the centrifugal forces of the machine is avoided. The vertical arrangement of a portion of the suction connection of the present invention is important for cutting off the last traces of lubricant which, in spite of the above-mentioned precautions and even in face of the opposite direction of the movement of the suction air, will enter the suction connection pipe.

In another advantageous embodiment of the present invention, the face of the rotor towards the foot of the housing is charged with oil over a larger surface than the opposite side of the rotor in a manner such that an axial force results which presses the rotor towards the closed end of the pot-shaped hood. This embodiment is particularly advantageous if the foot of the housing is made of a light-weight metal and the hood of a grey cast iron, since the wear of the less wear-resistent lid will be thereby reduced. In addition, the machine outlet and issuing lubricating oil may also be guided into the surrounding air or oil sump by the shortest possible route and without additional piping by this embodiment.

Furthermore, in order to prevent the rotating parts (e.g. a rotor) from jamming against a fixed part (e.g. the pot-shaped hood) on one hand, and to guarantee maximum efficiency of the vane machine on the other hand, the length tolerances of these parts must be very small and materials having coefficients of thermal expansion which are as equal as possible must be selected for all of the affected parts. In order to be as independent as possible in the selection of materials, the vane machine may be advantageously developed according to another embodiment of the present invention. In this embodiment, the two faces of the operating chamber (the vanes) may be limited by a compensating disc. However, it is also possible for the compensating disc to be arranged on only one face of the operating chamber. A cushion of lubricant or a compression spring may be used for pressing the compensating disc onto the front face of the operating chamber.

A passage may also be formed in the compensating disc which is designed as a sliding bearing for the pump drive shaft. With this embodiment it is no longer necessary to arrange or fit a bearing in the housing or housing lid respectively, thereby substantially simplifying the manufacture and operation of the vane pump. In addition, with this arrangement it is possible, when using sliding bearings, to produce the entire compensating disc from the sliding bearing material and to exchange it completely when worn.

The invention and further advantages thereof will be described in greater detail below with reference to the following drawings and selected embodiments thereof.

DESCRIPTION OF THE DRAWINGS

FIG. 4 is a side view of a portion of another embodiment of the rotary vane pump assembly shown in FIG. 1 in section taken along line IV—IV of FIG. 5;

FIG. 5 is an end sectional view of the rotary vane pump assembly shown in FIG. 4 taken along line V—V thereof;

DESCRIPTION OF THE PREFERRED EMBODIMENT

Figure 1:
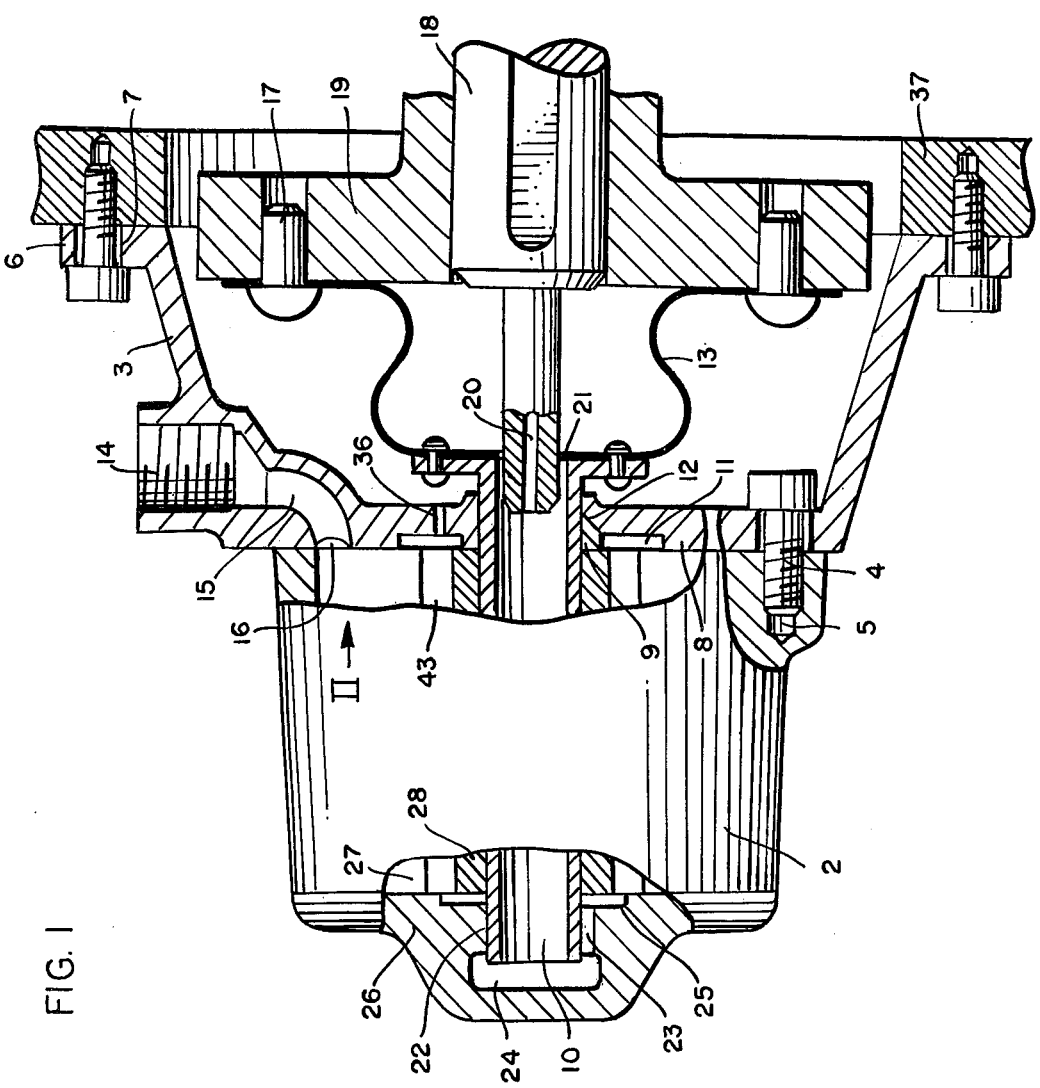
FIG. 1 is a side view in partial axial section of a rotary vane pump assembly constructed in accordance with an embodiment of the present invention.

Referring initially to FIG. 1, a rotary vane pump assembly is shown constructed in accordance with an embodiment of the present invention. Pump housing 1 consists of a pot-shaped hood 2 and a mounting flange having a bell-shaped foot portion 3. By dividing the pump housing in this way, the foot of the housing may be produced, for example, from aluminum and the hood of the pump from steel or grey cast iron, in order to save weight. The latter choice of material may be of importance since the rotor composed, for example, of sintered iron and the rotor vanes produced, for example, from a plastic on the one hand, and the pump hood produced, for example, from grey cast iron on the other hand, are generally to have practically equal coefficients of thermal expansion.

The pump hood 2 and foot of the housing 3 are joined together by means of short screws 4. The screw-threaded holes 5, for example three or four of which are distributed over the circumference of the pump housing, are designed as pockets. The lubricant in the pump housing is thus prevented from penetrating outwards through the screw threads without special sealing of the screw holes. On the motor side, the foot 3 of the housing is also fixed by means of short screws placed through holes 7 distributed uniformly over the circumference of the flange 6. This type of fixing reveals another advantage of dividing the pump housing into two parts. The long screws with which pumps of conventional design were fixed to the motor housing, and whose disadvantages have already been indicated above, are dispensed with. Even if the torque is determined when driving home the screws with such prior designs, it is not possible to definitely prevent the housing from being displaced and the rotor from jamming since the axial clearance is very small owing to the seal and the associated guarantee of maximum pump output. Only short screws are now used and the pump housing is no longer squeezed, even if light alloys are used as housing materials. The rotor and the rotor vanes are thusly prevented from jamming.

Pump hood 2 and foot 3 of the housing may be centered in relation to each other by means of alignment pins (not shown). The passage in the motor housing 37 is as large as the opening in the foot 3 of the housing. The oil which has collected there thus flows out into the motor without temporary storage. However, it is also possible to design the hole in the motor housing somewhat smaller so that an oil sump is formed in the foot of the housing.

In the embodiment of the invention shown in FIG. 1, the pump-side fixing flange directed radially inwards on the foot 3 of the housing is at the same time designed as a pump lid 8 and as a sliding bearing 9 for the hollow pump shaft 10. The pump lid 8 also incorporates an annular groove 11 and passages 12 and 36 the functions of which will be described in more detail below.

The foot 3 of the housing is used not only for connecting the pump hood 2 to the motor, but it also simultaneously incorporates the compensating coupling 13 and the vacuum connection 14 and feeds the oil flowing back and the air drawn off into the motor. Space is thus utilized particularly well and, in contrast to the conventional connection of the vacuum pipe and reflux pipe on the periphery of the pump housing, space is no longer required for the front face connection. The advantage of the front face inlet of the vacuum pipe 15 has already been described above.

Figure 2:
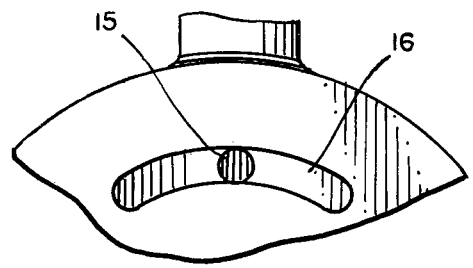
FIG. 2 is a partial end sectional view of a portion of the pump chamber shown in FIG. 1 in the direction of arrow II.

FIG. 2 shows in detail the reniform extension 16 of the vacuum pipe 15.

In the example given, the compensating coupling 13 consisting of a leaf spring is firmly riveted on the pump side to the pump shaft 10 which is designed as a hollow shaft and which is easily detachably connected on the motor side with a disc fly wheel 19 or a flange disc resting fixedly on the drive shaft 18 by means of the bolts 17. The pump may be driven by any other intermediate shaft which is driven by the motor instead of the drive shaft 18. An oil supply pipe 20 which is connected to the central lubricating system of the motor is formed by the drive shaft 18 designed as a hollow shaft, the free end of the oil supply pipe 20 projecting through the end opening 21 of the pump shaft 10, and the oil supply pipe 20 injects oil used for lubricating and sealing the front opening 21 into the hollow pump shaft 10.

The sliding bearing 22 in the closed end of the pump hood 2 has a lubricant groove 23 through which the lubricant accumulating in the storage chamber 24 passes through the recess 25 in the end wall 26 into the pump hood 2. The recess 25 connects the foot chambers of the vane slots 43 to each other in the rotor 28. The lubricant passes from the recess 25, through slots 43 in which vanes 27 radially slide, into annular groove 11 and lubricant passage 12, into sliding bearing 9 and finally through passage 36 into the oil sump in the foot 3 of the housing. In this way, an efficient flow of oil is obtained in the vane pump. However, ball bearings or other rolling bearings may be used instead of the sliding bearings, in which case the recess 25, the annular groove 11 and the oil passages 12 would be superfluous. The embodiment according to FIG. 1 thus proves to be particularly economical. Instead of the recess 25, it may also be advantageous to provide a groove 23 running radially and thus extending sufficiently far to periodically connect the lubricant groove to the slots in the vane foot chambers 43.

Figure 3A:
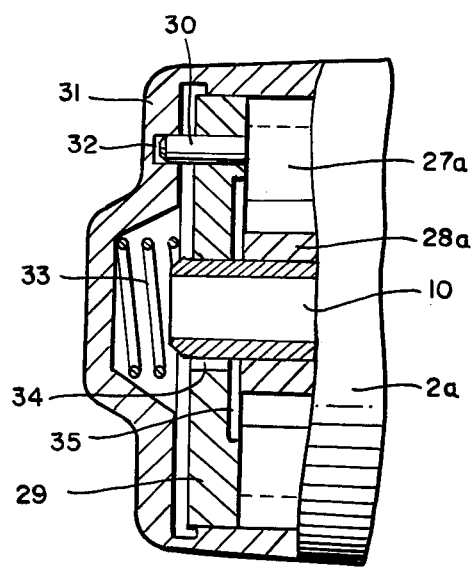
FIG. 3a is a partial side view in partial axial section of the hood end of the rotary vane pump assembly shown in FIG. 1.

FIG. 3a shows a variation of the mounting for the pump shaft. This type of mounting is particularly advantageous if the coefficient of thermal expansion of the material used for the pump hood is different from that of the material for the rotor 28 and the vane 27. The left-hand face of the pump chamber is accordingly formed by the compensating disc 29 slidably mounted in the internal casing of the pump hood 2a. The compensating disc 29 is prevented from twisting by an axially parallel pin 30 fixed on it and engaging a recess 32 formed into the end wall 31 of the pump hood 2a. The compression spring 33 supported on the end wall 31 presses the compensating disc 29 axially against the rotor 28 or against the vanes 27. This axial pressure exerted by the compensating disc 29 on the rotor 28 is necessary, particularly when starting up the pump since a vacuum has not yet built up in the pump chamber which would otherwise press the compensating disc 29 against the face of the rotor 28 in the course of complete operation of the pump, together with the atmospheric pressure acting on the left-hand face of the compensating disc 29.

Figure 6:
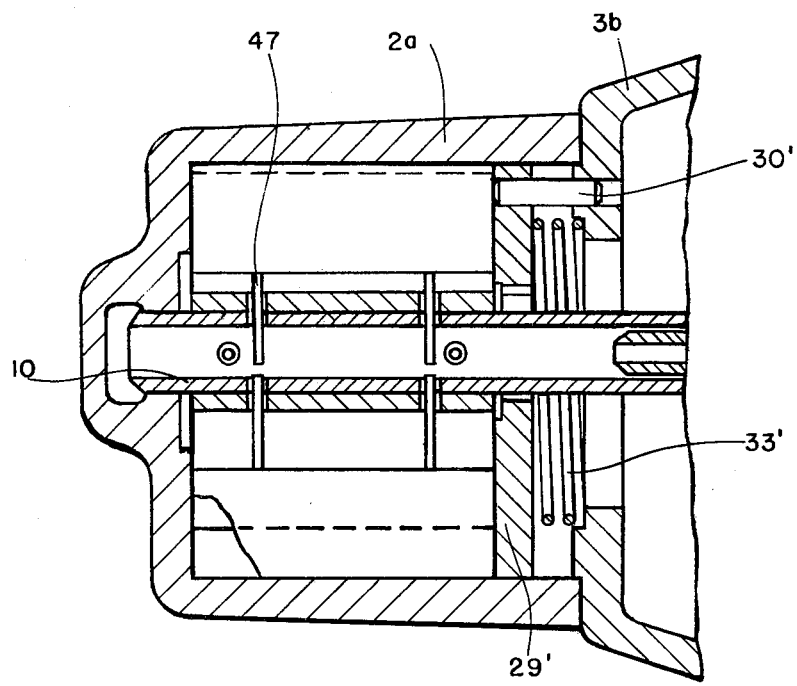
FIG. 6 is a side view in partial axial section of a rotary vane pump assembly similar to FIG. 4 but illustrating an alternative embodiment of the invention.
Figure 7:
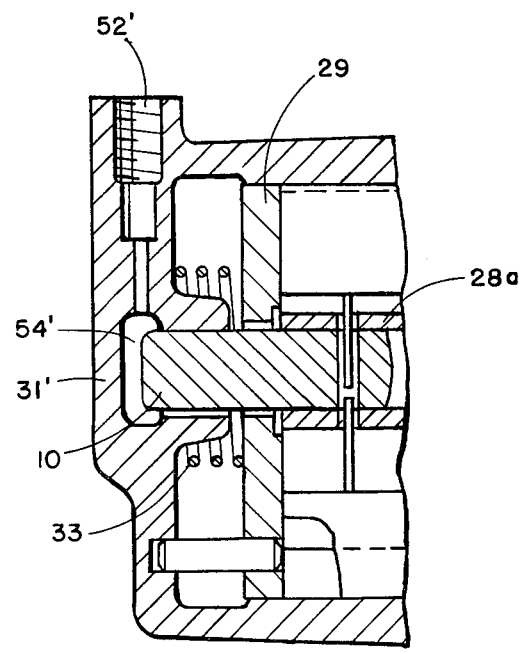
FIG. 7 is a partial side view in partial axial section of the hood end of a rotary vane pump assembly similar to that shown in FIGS. 3a and 3b illustrating still another embodiment of the invention.

In the embodiment of the vane pump shown in FIG. 3a, the end of the pump shaft 10 turned away from the motor is mounted in the compensating disc 29. In this figure, the sliding bearing as in the embodiment in FIG. 1, may have a lubricant groove 34 through which the lubricant enters the recess 35 whence it is distributed as described with reference to FIG. 1. Furthermore as shown in FIG. 6, a compensating disc 29' can be provided on the open end of the pump hood 2a instead of the compensating disc 29 at the closed end of the pump hood 2a as shown in FIG. 3a. In addition, with the arrangement of the compensating disc 29 on the closed end of the pump hood 2a shown in FIG. 3a still another arrangement can be achieved as illustrated in FIG. 7 where, the end of the pump shaft 10 turned away from the motor is mounted in an inwardly projecting extension of the end wall 31' of the pump hood and the compensating disc 29 is then slid onto the pump shaft 10 with a relatively snug fit. The oil supply passage 52' opens into storage chamber 54' to supply oil to the vane slots as described below in connection with FIG. 3b.

As the vane pump heats up during operation, the use of this compensating disc permits relative axial movement between rotor 28 and vane 27 on the one hand, and pump hood 2 on the other hand, so that the degree of efficiency of the pump remains at an optimum. If the material of the pump hood 2 has a higher coefficient of thermal expansion than the material of the rotor 28 or the vanes 27, an annular gap would be formed between the motor end wall of the hood without the compensating disc, resulting in leakages and thus a reduction in the pump output. If the pump hood material has a lower coefficient of thermal expansion than the material of the rotor 28 or the rotor vanes 27, then if the compensating disc were not used the rotor and vanes would jam between the end walls of the pump chamber. This would initially reduce the pumping action and in the most undesirable case the pump may even break down completely. It can be seen that owing to this embodiment of the pump the coefficient of thermal expansion may be ignored when selecting the part materials and greater attention may therefore be paid to other important criteria for the selection of these materials.

Figure 3B:
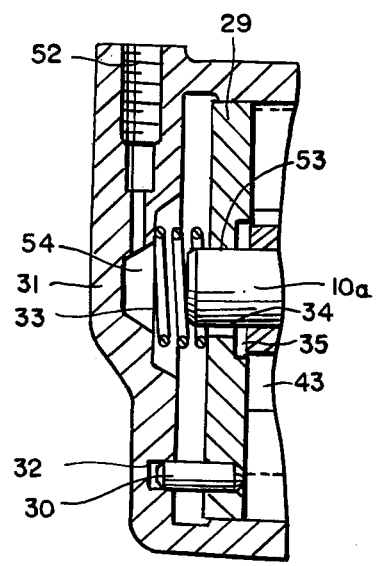
FIG. 3b is a partial side view in partial axial section of the hood end of a rotary vane pump assembly similar to that shown in FIG. 3a illustrating another embodiment of the present invention.

The pump illustrated in FIG. 3b shows how the compensating disc 29 is pressed both by the lubricant pressure and by the pressure of the compression spring 33 on to the face of the vanes 27. An alternative lubricant supply is shown at the same time in this figure. It is constructed externally and consists of an oil supply passage 52 in the front face 31 of the pump housing. This passage opens into a storage chamber 54 arranged between the inner wall of the housing and the compensating disc. The oil passes from the storage chamber 54 via the lubricant groove 34 to the recess 35 and thence to the vane slots 43.

The front sliding bearing of the pump shaft 10a, made solidly in this example owing to the external lubricant supply, is also arranged in the compensating disc 29. It is provided with lubricant through the storage chamber 54, the lubricant groove 34 and the recess 35.

In the pump shown in FIGS. 4 and 5, the foot 3b of the housing is produced from light metal, for example from aluminum. The pump hood 2b is produced from a more wear resistant material, for example cast iron. In the end wall 40 of the pump hood 2b is arranged a bearing bushing 41 which is a few millimeters shorter than the thickness of the end wall 40 in the region of the sliding bearing.

The external diameter of the bearing bushing 41 is smaller than the root diameter of the vane slot. An annular groove 42 is thus formed, in which lubricant collects and the lubricant passes outwards between the rotor 28 and the end wall 40 into the vane slots owing to the centrifugal force acting upon it. As already described in connection with FIGS. 1 and 3a, the oil passes through the hollow shaft 10, the storage chamber 24 and the lubricant groove 44 into the annular groove 42. A larger annular groove 45 is formed in the pump lid 8b on the opposite side and also fills with oil which has passed on the one hand, through the vane slots 43 and on the other hand, through the radial passages 46 for the connecting pins 47. The annular surface of the groove 45 is considerably larger than that of the annular groove 42 on the closed end of the pump hood 2b so that the axial force directed on the rotor 28 towards the closed end of the pump hood resulting from the oil pressure is larger than the axial force directed against the pump lid 8b via the opposite rotor face. If the material used for the bearing or for the bearing bushing 41 has very good emergency running properties, the annular groove 42 may be omitted completely.

The sliding bearing 9 in the pump lid 8b is provided with lubricant outwards from the annular groove 45 via the passages 48. Instead of the passages 48, the smaller diameter of the annular groove 45 may be identical to the external diameter of the hollow shaft 10 and the sliding bearing 9 may have a lubricant groove (similar to the lubricant groove 44 at the opposite end of the hollow pump shaft 10) so that the sliding bearing 9 is supplied with lubricant directly from the annular groove 45.

FIG. 5 shows, in particular, the reinform-shaped vacuum opening 49 and the also reinform opening 50 for the outlet of the air drawn off and for the oil flowing back. The oil flowing back runs directly into the oil sump in the foot 3 of the housing or through the foot 3 of the housing into the oil sump in the motor housing while the vacuum pipe entering the foot 3b of the housing via the connection 51 opens in the opening 49.

With each rotation of the rotor 28, each vane 27 is submerged once almost to the foot of the slot 43 in the vane. The vane 27 thus pushes the oil previously drawn into the slot 43 mainly to the side and, in particular, into the annular groove 45 provided for this purpose. Only a relatively small amount of oil will flow out through the passage 46 and into the axial gap between the rotor and end wall 40. The oil pressed into the annular groove 45 charges in pulses the face of the rotor 28 between the vane slot 43 in the axial slot between the rotor and the pump lid 8b. In addition, each time a vane 27 passes over the outlet opening 50 towards the end of the delivery stroke, oil, which is carried along by the issuing air, is pressed in pulses into the axial gap between the rotor face and pump lid 8b. The axial forces resulting from these pulsed charges push the rotor 28 against the closed end of the pump hood 2b so that the friction and thus the wear of the pump lid 8b which may be composed of less wear-resistant material (for example aluminum) is kept small.

The danger of the pump vibrating as a result of these pulsed charges of the rotor face does not exist since the intertia of the rotary body prevents vibrations from building up at the relatively high frequency of the pulses.

While several particular embodiments of the present invention have been shown and described in detail, it should be understood that various obvious changes and modifications thereto may be made, and it is therefore intended in the following claims to include all such modifications and changes as may fall within the spirit and scope of this invention.

What is claimed is:

1. In a rotary vane pump and in particular the type used for producing vacuum in motor vehicle power brake assistance units wherein a compensating coupling connects a relatively horizontally located pump drive shaft with the drive motor of the pump and a lubricant oil is supplied to the working elements of the pump from said drive motor, the improvement comprising:
 a pot-shaped hood which has a closed end wall sealing off the free end of the drive shaft and which receives and circumferentially surrounds the working components of the pump and, in particular, the rotor and vanes; and
 a mounting flange having a bell-shaped foot portion which is totally enclosed on its circumference surrounding the compensating coupling and a lid portion covering the open end of said pot-shaped hood, said bell-shaped foot portion being formed as an oil collector for the lubricant oil flowing out from said working components and having a suction pipe connection arranged relatively vertically in a cross-sectional plane thereof and then turning in a direction axially parallel to the pump drive shaft to open, after crossing the lid portion which is located between said pot-shaped hood and said bell-shaped foot portion, above said pump drive shaft in the suction chamber of the pump, and said lid portion having an outlet opening for discharging the lubricant oil and air from the working components of the pump, said outlet opening being located below said pump drive shaft.

2. The rotary vane pump of claim 1 wherein the lid portion of said mounting flange has a sliding bearing formed therein in which the pump drive shaft rotates.

3. The rotary vane pump of claim 1 wherein a recess is formed in the lid portion of said mounting flange or the open end portion of said pot-shaped hood which connects the bearings within which said pump drive shaft rotates with the chambers created between the base of the rotary vanes and the slits formed in said rotor in which said vanes radially slide.

4. The rotary vane pump of claim 1 wherein said bell-shaped foot portion is made of a light-weight metal.

5. The rotary vane pump of claim 1 wherein said opening of the axially extending portion of the pipe connection is formed in a circumferential direction as a reniform-shaped recess.

6. The rotary vane pump of claim 1 wherein the foot portion of said mounting flange has an outwardly directed flange for fixing said mounting flange on said drive motor formed on one end thereof and said lid portion has a second flange portion formed thereon for joining said pot-shaped hood to said lid portion.

7. The rotary vane pump of claim 6, wherein said second flange portion points radially inward and seals said pot-shaped hood to said lid portion.

8. The rotary vane pump of claim 7 wherein said pot-shaped hood has at its open end fixing means for connecting said hood to the radially inward pointing portion of said second flange.

9. The rotary vane pump of claim 8 wherein said fixing means comprises screw-threaded passages extending to the open end of said pot-shaped hood which are formed as pockets.

10. The rotary vane pump of claim 1 wherein said outlet opening is formed in the lid portion of said mounting flange facing said working components as a passage extending axially parallel to the pump drive shaft.

11. The rotary vane pump of claim 10 wherein said axial outlet opening connects with the oil-collecting foot portion of said mounting flange.

12. The rotary vane pump of claim 11 wherein said axial outlet opening facing said working components is formed in a circumferential direction as a reniform-shaped recess.

13. The rotary vane pump of claim 1 wherein an annular groove is formed in the lid portion of said mounting flange which at least partially intersects with the chambers created between the base of the rotary vanes and the slits formed in said rotor in which said vanes radially slide.

14. The rotary vane pump of claim 13 wherein an annular groove is formed in the inner face of said pot-shaped hood facing said working components, the diameter of said annular groove being smaller than the base diameter of said rotary vane base chambers.

15. The rotary vane pump of claim 1 further comprising a compensating disc limiting operating chamber of said working components in an axial direction, said compensating disc being pressed against the face of said vanes by means of a cushion of lubricant or a compression spring.

16. The rotary vane pump of claim 15 wherein said compensating disc has a passage formed therein which is designed as a sliding bearing for the pump drive shaft.

* * * * *